United States Patent [19]

Wilson

[11] 4,060,945
[45] Dec. 6, 1977

[54] COMPOST BIN

[75] Inventor: Clifford Arthur Wilson, New Hope, Pa.

[73] Assignee: Rotocrop International, Ltd., Nassau, Bahamas

[21] Appl. No.: 676,107

[22] Filed: Apr. 12, 1976

[30] Foreign Application Priority Data

Sept. 24, 1975 United Kingdom ............... 39174/75

[51] Int. Cl.$^2$ ........................ E04G 11/04; C05F 11/06
[52] U.S. Cl. ..................................... 52/169.5; 52/245; 23/259.1
[58] Field of Search .................... 52/245, 169, 27, 197, 52/198, 302, 303, 5; 71/6, 8, 9, 15; 220/4 F, 5 R; 4/116, 117, 132; 23/259.1

[56] References Cited

U.S. PATENT DOCUMENTS

| 46,318 | 2/1865 | Adamson | 71/15 |
|---|---|---|---|
| 1,133,072 | 3/1915 | Vanstrom | 220/4 F |
| 1,155,889 | 10/1915 | Clarke | 52/27 |
| 2,573,838 | 11/1951 | Fulkerson et al. | 52/169 |
| 3,951,294 | 4/1976 | Wilson | 220/5 R |

FOREIGN PATENT DOCUMENTS

| 121,822 | 8/1927 | Switzerland | 71/15 |
|---|---|---|---|

Primary Examiner—James L. Ridgill, Jr.
Attorney, Agent, or Firm—Allegretti, Newitt, Witcoff & McAndrews

[57] ABSTRACT

An improved compost bin is disclosed and a ventilation channel is formed directly beneath the compost contained in the bin. A tunnel member having a perforated upper portion is contained in the channel to maintain a free passage for air to the base of the heap. The tunnel also prevents the walls of the channel from collapsing and the passage thereby becoming blocked either by the substrate on which the bin is mounted on by decomposing vegetable matter from the bin.

In preferred embodiments, end caps are provided to further inhibit the encroachment of the substrate around the walls of and into the tunnel. Holes are provided in a central portion of each end caps to ensure free passage of air.

The bin comprises a plurality of similar panels which interengage to form a plurality of vertical sliding joints. The dimensions of the panels and the tunnel are preferably such that, when not in use, the panels may be confined within the tunnel. The bin is normally sold in a kit taking this form. End caps, where used close the tunnel and auxiliary elements such as locking pins and a cover may thus be contained in the package.

18 Claims, 6 Drawing Figures

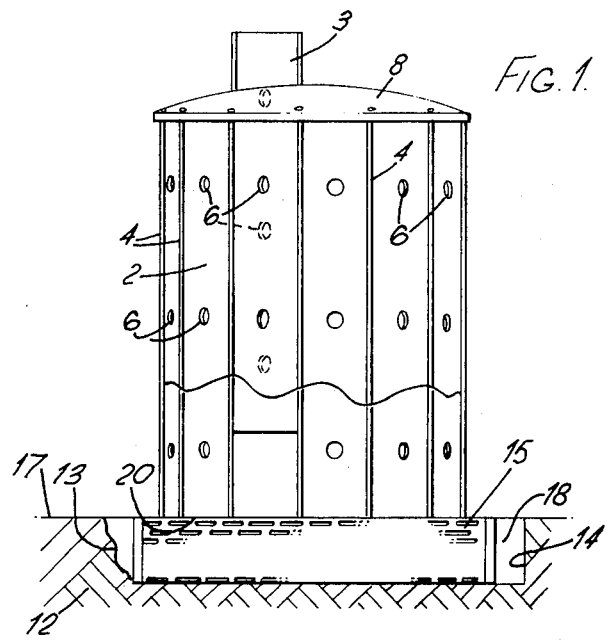
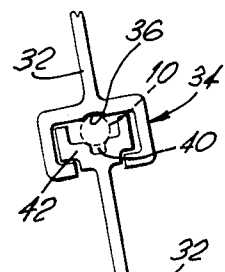
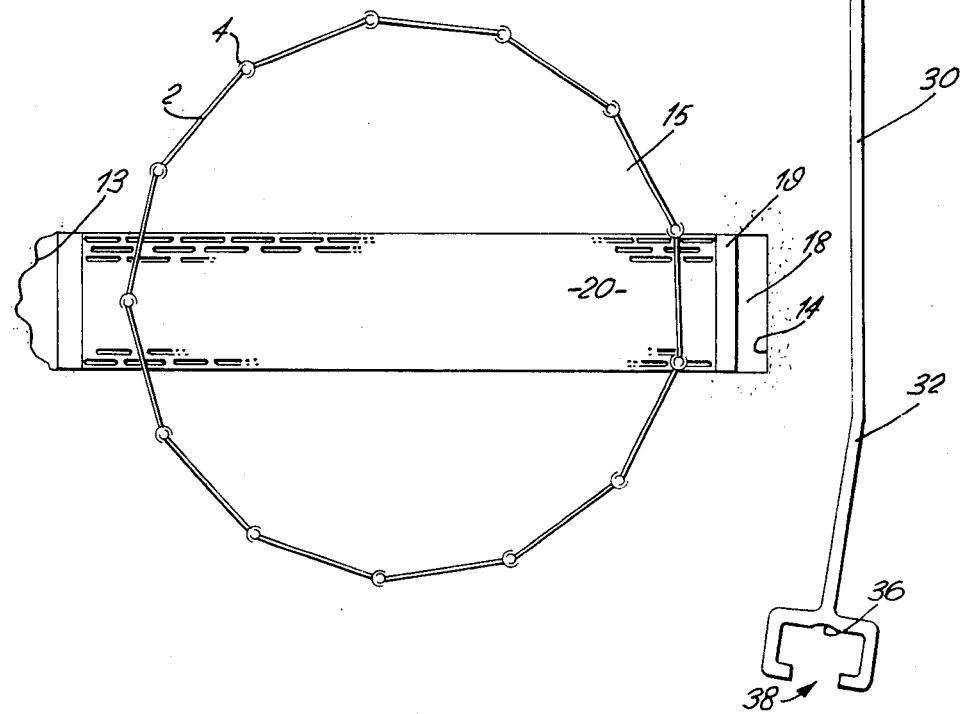

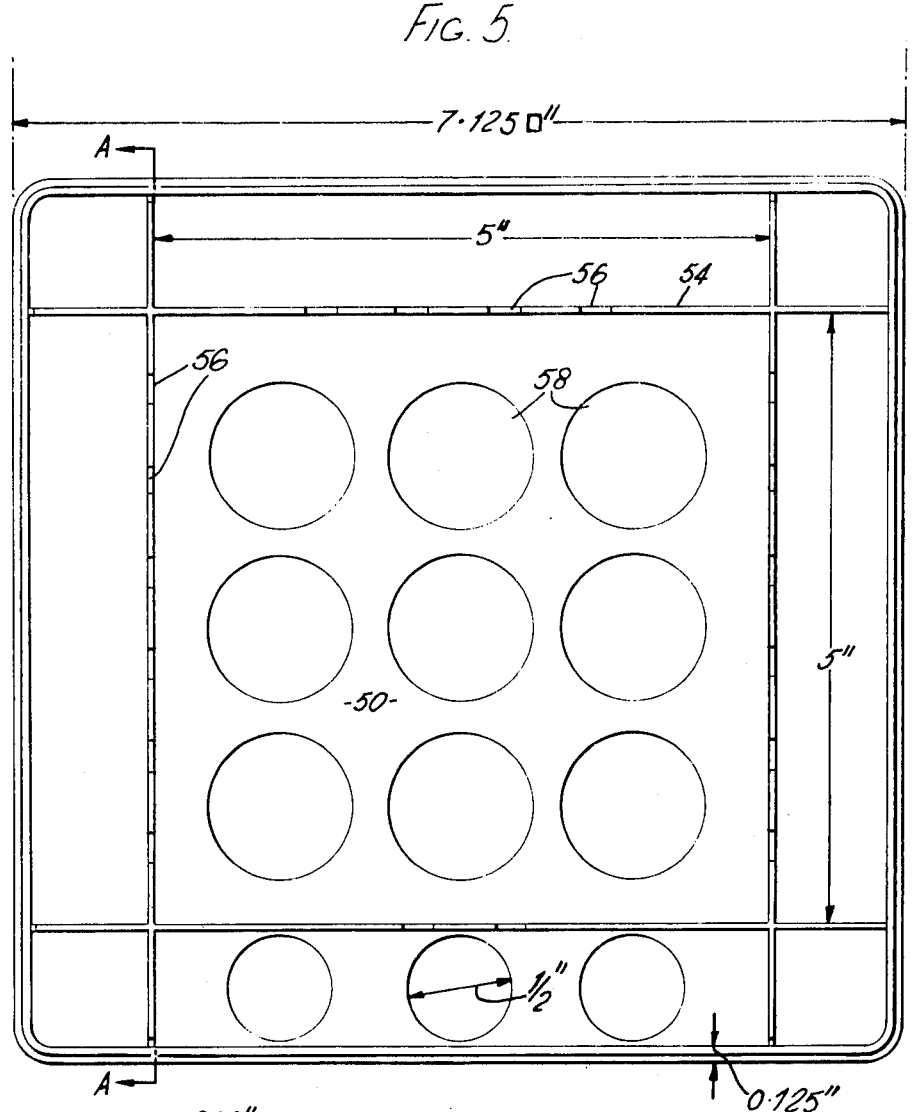
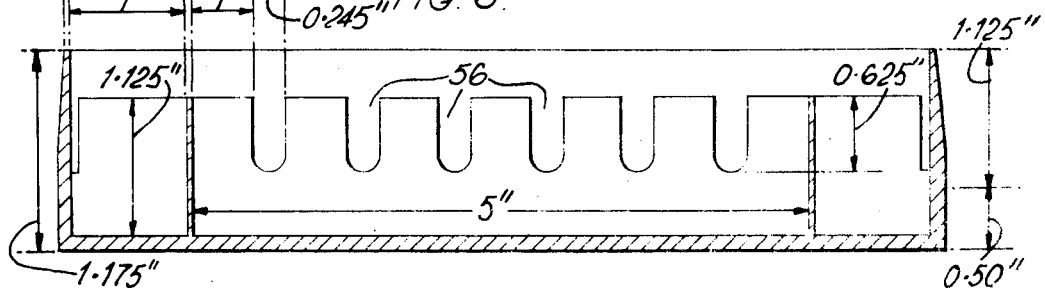

COMPOST BIN

BACKGROUND OF THE INVENTION

Compost bins are currently in extensive use as they provide an economic means for transforming what has been generally regarded as waste into a useful material. Unassisted, however, the chemical process of decomposition is relatively slow and the advantages of controlling the process inexpensively such that maximum efficiency in the production of compost is achieved is highly desirable. A compost bin which goes some way towards achieving more efficient decomposition is disclosed in U.K. patent specification No. 1,427,331.

SUMMARY OF THE INVENTION

When a heap of vegetable matter decomposes to usable compost, it is important to have adequate ventilation. The speed of decomposition can be increased if there is a ready supply of air available at the base of the heap. I have now found that the rate of decomposition may be further increased and the qualities of the compost produced improved by the provision of a ventilated channel in the base of the heap.

According to the present invention, a compost bin is provided with a tunnel member at the base of the bin which would normally extend substantially across a diameter thereof. The tunnel member is formed with apertures in at least an upper portion whereby air in the tunnel can have access to the matter contained in the bin.

More specifically, the invention provides a compost bin supported on a substrate in which a channel of predetermined length has been cut comprising a tunnel member of length less than said predetermined length laid in the channel, an upper portion of the tunnel member being perforated; and a plurality of similar panels, each having a pair of parallel straight edges which are slidably interengaged to form a continuous substantially vertical bin wall over the channel, the channel traversing the cross-section of the bin wall, any one panel being movable with respect to adjacent panels to afford access to the interior of the bin. The channel would normally traverse a diameter of the bin wall cross-section.

The method of constructing a compost bin according to the invention on a substrate comprises cutting a channel of length greater than that of the tunnel member in the substrate; laying the tunnel member in the channel; interlinking the plurality of panels to form a continuous bin wall and locating the wall over the channel whereby the wall crosses the channel at two places. Compost may then be produced from vegetable matter by discharging vegetable matter from above into the bin as it becomes available, storing the matter in the bin while at least a lower portion thereof decomposes to compost, and subsequently raising at least one of the panels in the wall and removing compost from said lower portion. Each panel being movable without disturbing the others, compost may be removed from a number of peripheral locations in the same layer of vegetable matter therein. As the lower portion is removed, it is replaced by matter contained in higher layers which continue to decompose in the bin.

The tunnel member normally takes the form of a hollow prism which is laid in a channel cut in the substrate upon which the bin is to be supported. The prism is preferably of square or rectangular cross-section, at least one side of which is perforated to ventilate the bin interior. Of course other faces may also be perforated to further enhance the flow of air into and out of the tunnel but the principle flow path is always through the upper portion.

The interior of the tunnel is desirably maintained as clear as possible, and it is also important that a free flow of air into and out of the tunnel is assured. Where the tunnel is laid in an earth substrate supporting the bin, the extremities of the tunnel would normally extend beyond the boundaries of the bin. The perforated upper portion of the tunnel may thus provide communication not only between the contents of the bin and the interior of the tunnel, but also between the tunnel and the atmosphere outside the bin. However, greater ventilation is desirable and it is preferred that flow paths are also provided through at least one end of the tunnel. For this reason, the channel in which the tunnel is laid is cut longer than the tunnel itself providing unimpeded access for air to the tunnel interior.

The tunnel may also be provided with end caps which protect the periphery of the tunnel ends from adjacent matter. One or more ventilation holes are provided in a central portion of each end cap and drainage holes may be provided along one edge to allow water to drain away.

The invention has especial value where the bin is to be supported on a soft substrate or upon one in which a stable channel may not be cut. For example in sandy or crumbly soil, channel walls will require reinforcement and the tunnel described herein provides just that reinforcement. End caps permit the ends of the channel to be less neatly prepared without increasing the possibility of earth seeping into the tunnel. If desired, additional ducting may be applied to the end caps to further assure good ventilation.

The tunnel may take the form of an inverted channel, but the resilience of a tubular or prismatic cross-section is preferred. The prismatic shaped tunnel is preferred because it is less subject to deformation or unintentional movement after placement. Additionally, a square or rectangular cross-section provides a box which may be used to contain the constituent panels and auxiliary elements during transit.

The bin is usually supplied in the form of a kit comprising a plurality of similar panels, each panel having two parallel straight edges of which one has a cross-section mateable with the other to form a sliding joint between adjacent panels, the plurality of panels being interengageable to describe a bin, said panels being confined in a hollow tunnel member, having a portion thereof perforated, for use as a base ventilator in the constructed bin. The kit would normally include auxiliary elements such as a cover for the bin and a plurality of pins for releasably securing the sliding joints.

Where the length of the tunnel member is equal to or greater than the length of the panels the panels are contained within the tunnel member and end caps, where provided may close the ends. The auxiliary elements are preferably housed in the end caps although any available space in the tunnal member may of course be used.

While the practical advantages offered by the invention will be apparent from the previous and the following description, an additional advantage lies in the provision of a unit which provides all the elements of an efficiently operating compost bin, one of which comprises a container for the remaining elements. Thus, a separate container for the elements is not required for storage or transit with the resultant savings in packaging expenditure which would otherwise have to be met by a purchaser of the unit.

The invention will now be described by way of example with reference to the accompanying drawings wherein:

FIG. 1 shows a sectional elevation of a compost bin constructed in accordance with the invention;

FIG. 2 shows a plan view of the illustration of FIG. 1 with the bin empty of vegetable matter and the cover removed;

FIG. 3 shows an end view of a preferred panel for use in the bin, and illustrates the manner in which a joint is made between adjacent panels;

FIG. 5 is a plan view of an end cap; and

FIG. 6 is a section on line A—A of FIG. 5.

Figure 4:
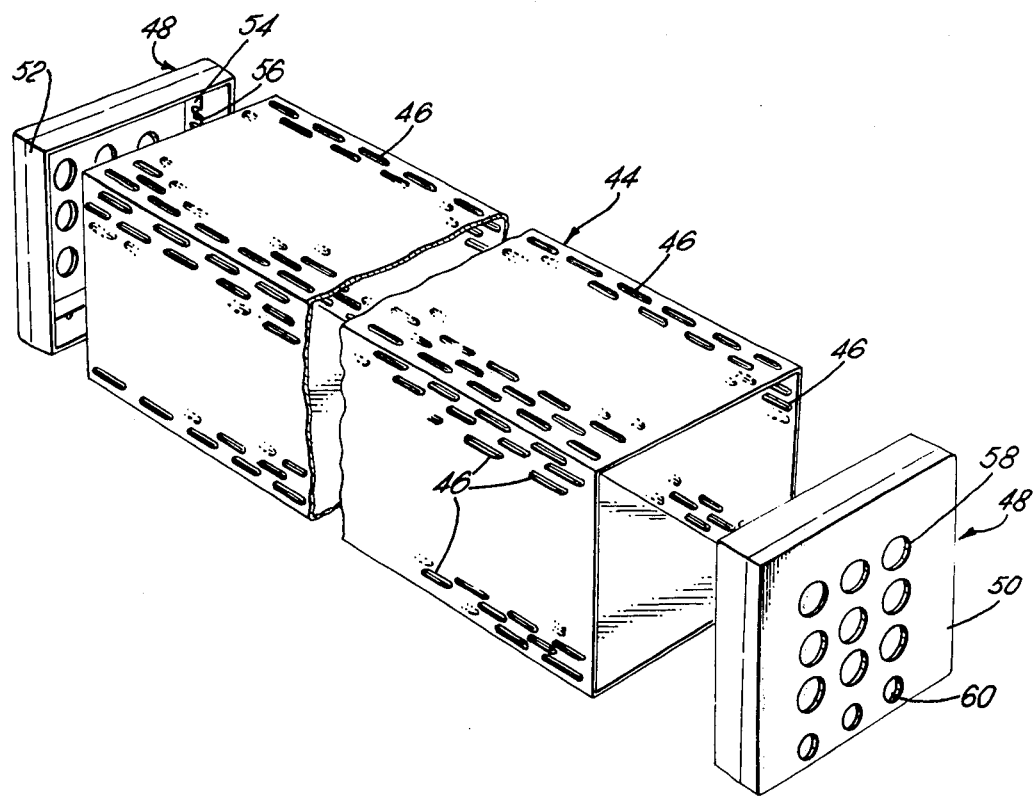
FIG. 4 is a perspective exploded view of the tunnel of the invention with the end caps.

FIGS. 1 and 2 show a compost bin constructed in accordance with the present invention. It comprises a plurality of panels 2 having straight parallel sides which interlink to form sliding joints 4. Each panel is formed with three apertures 6 which serve to ventilate the matter decomposing in the bin. The top of the bin is closed by cover 8 which is secured to the panels by pins 10. The cover is preferably inflatable as shown which serves the double purpose of assisting heat insulation and deflecting, for example, rain or leaves if and when they fall. Pins 10 engage the sliding joints to lock them until a panel is to be moved, when they may be withdrawn. A joint is described in greater detail with respect to FIG. 3. In FIG. 1, the bin is shown supported on earth 12. The tunnel member 15 is buried in a channel 18 which is cut before constructing the bin. In this way the tunnel member may extend beyond the diameter of the bin as shown, and only the upper face 20 of the tunnel need be perforated, the perforations communicating the interior of the tunnel with both the atmosphere outside the bin and the vegetable matter within. The channel is preferably cut longer than the tunnel whereby air may also enter the tunnel through the open ends or through vented end caps 19 as discussed in more detail hereinafter. The channel ends are unlikely to remain square as shown at 14, and end caps will resist the entry of earth as shown at 13. Though special ducting may be coupled to the end caps to guarantee access to a fresh air source, such ducting is not felt to be essential. The bin is constructed by cutting channel 18 to the cross-sectional dimensions of the tunnel member 15 and slightly longer to allow end ventilation. The tunnel member is then laid in the channel with its apertured face uppermost and substantially flush with the earth surface 17. The panels are interlinked to form a closed bin wall wherein one or more panels; e.g., panel 3, may be raised to afford access to a lower portion of the contents of the bin. The bin wall is placed as shown over the tunnel and channel with the tunnel extending beyond the periphery of the bin wall. The cover 8, which is preferably in the form of a substantially circular inflatable pillow, is then inflated and secured to the top of the bin by pins 10.

In use, vegetable matter is discharged into the bin, as it becomes available, by removing one or more pins 10, raising the cover 8, and emptying the matter into the access hole formed. As matter accumulates in the bin, a number of layers are formed and in time, each layer reaches a different stage of decomposition. Compost is removed by raising one or more panels; e.g., panel 3, and withdrawing the compost directly form the lowermost layer. By sequentially removing compost from different peripheral locations, substantially only that matter at the latest stage of decomposition can be removed before the next layer takes its place.

The dimensions of the tunnel are preferably chosen to accommodate the panels, cover and pins whereby the elements of the bin may be stored in kit form and in a single unit as will be seen hereinafter.

The aspect ratio of the constructed bin is usually greater than unity; for example, as is illustrated in FIG. 1. A preferred embodiment comprises 18 panels, each 36 inches long by 7 inches total width in a box ventilator tunnel 37¼ inches long and 7 by 7 inches inside dimensions. The additional length of the tunnel provides room for the additional elements of the kit and/or space for the attachment of end caps.

FIG. 3 shows an end view of a preferred form of panel which comprises a central planar portion 30 and two inclined planar portions 32. While the edge sections of the panels shown in FIG. 2 are part circular, it is preferred to use a polygonal section of the kind illustrated in FIG. 3. The flexibility of the circular joint is foregone but the substantially circular shape of the bin is retained by the inclination of portions 30 and 32. Many polygonal sections may be employed but the closed rectangular fork of the kind illustrated has additional advantages. The contiguous surfaces engage in such a way as to minimize heat loss and the tensile strength is greater than that of the circular joint which renders the polygonal shape particularly useful in large bins which are of course, subject to greater peripheral stresses. The illustrated panel has two parallel edges 38 and 42. The cross-section of edge 42 is such that it fits neatly into the convex forked section of edge 38 as shown to form a sliding joint. Additionally, the configuration shown provides a space between the connected panels in which a setting pin 10 may be fitted. The shaft of the pin engages surface 36 and 40 of the respective cross-section to urge them apart, thereby temporarily locking the joint. These pins are used to hold cover 8 onto the bin but are easily removable to afford partial removal of the cover and access to the interior for delivery of vegetable matter thereto.

A typical tunnel is shown in FIG. 4. It comprises square or rectangular hollow prism 44, in one or sometimes more faces of which apertures 46 are formed. The exact nature of the apertures is not critical, though elongate holes are presently preferred. The tunnel is normally formed in extruded plastics material with a preferred wall thickness of about 0.060 inches.

End caps 48 comprise plate 50 with walls 52 extending therefrom to encompass the ends of prism 44. Also formed on plate 50 is a frame 54, shallower than the walls 52 and stopping short of the walls to engage and grip the faces of prism 44 upon closure. In frame 54 are formed recesses 56 for holding the locking pins. End ventilation holes 58 (nine are shown) are included and drain holes 60 are provided in the end caps to permit any water caught in the tunnel to drain away. These features are illustrated more clearly in FIGS. 5 and 6 upon which the respective dimension for the embodiment of 18, 7-inch panels are shown.

All the elements of the invention are normally constructed in a plastics material which satisfies the requirements of flexibility and durability, while also providing the requisite heat insulation properties. The tunnel of the invention can serve the double purpose of providing efficient base ventilation and a container for the remaining elements of the bin for storage or transport. It should be noted of course, that the amount of ventilation is controlled not only by the size of the tunnel but also the size of the apertures.

I claim:

1. An improved compost bin for decomposing vegetable matter and the like, the improved compost bin being adapted to be supported on a substrate such as the earth in which a channel having a predetermined length has been cut and comprising:

a substantially vertical bin wall including a plurality of similar panels and defining a substantially vertically disposed chamber which has an upper end and a lower end and which is used for receiving the vegetable matter and the like to be decomposed, each of the panels having a first side edge and a second side edge and being positioned, relative to the other panels, so that its first side edge is adjacent to the second side edge of one panel and so that the second side edge is adjacent to the first side edge of another panel; means for slidably interengaging the adjacent panel edges so that a panel may be selectively vertically moved, with respect to its adjacent panels, so as to permit access from outside the bin wall into the interior of the chamber; the bin wall being positioned on the substrate so that the channel underlies and is in communication with a portion of the lower end of the chamber and so that the remaining portion of the lower end of the chamber is adjacent to and in communication with the substrate on which the improved compost bin is supported, with the predetermined length of the channel being greater than the cross-sectional length of the portion of the lower end of the chamber so that air from without of the bin wall may pass through the channel and into the interior of the chamber; and a tunnel member disposed in the channel and having a perforated upwardly facing wall portion, with at least a part of the tunnel member underlying the portion of the lower end of the chamber.

2. A compost bin according to claim 1 wherein the tunnel member has a non-circular cross-section; wherein the channel intersects the longitudinal center line of the chamber; and wherein the panels include perforations which permit air to flow into interior of the chamber.

3. A compost bin according to claim 1 wherein the length of the tunnel member is at least equal to the height of the panels.

4. A compost bin according to claim 1 including a plurality of pins, some of which engaging points of interengagement of the panels to secure the joints.

5. A compost bin according to claim 1 including end caps for the tunnel.

6. A compost bin according to claim 5 wherein the end caps are provided with ventilation holes.

7. A compost bin according to claim 1 wherein the first and second side edges are straight and are parallel; wherein the first side edges comprise a slot having a convex, forked cross-section; and wherein the second side edges comprise a bead complimentary to the slot.

8. A compost bin according to claim 7 wherein the cross-section of each of the bead and slot is polygonal.

9. A compost bin according to claim 1 wherein the tunnel member has a length less than the predetermined length of the channel.

10. A compost bin according to claim 9 wherein the length of the tunnel member is greater than the cross-sectional length of the portion of the lower end of the chamber; and wherein both ends of the channel are disposed without the bin wall.

11. A compost bin according to claim 1 including a flexible cover secured thereto.

12. A compost bin according to claim 11 wherein the cover is inflatable.

13. A compost bin according to claim 11 wherein the flexible cover is secured to the bin by a plurality of pins, with some of the pins engaging the points of interengagement of the panels.

14. A kit of parts for making a compost bin according to claim 1, which kit comprises a plurality of similar panels, each panel having a pair of parallel straight edges of which one has a cross-section mateable with the other to form a sliding joint between adjacent panels, the plurality of panels being interengageable to describe a bin; and a hollow tunnel member adapted to be supported in a substrate such as the earth having a portion thereof perforated, the panels being confined in the tunnel member.

15. A kit according to claim 14 wherein the tunnel member is of square or rectangular cross-section.

16. A kit according to claim 14 wherein the length of the tunnel member is at least equal to the length of the individual panels and including end caps for the tunnel whereby the panels are contained in the tunnel.

17. A kit according to claim 16 including a cover for the bin and a plurality of pins for securing the cover to the bin, the cover and pins being housed within the end caps.

18. A kit according to claim 16 wherein the end caps are provided with ventilation holes.

* * * * *